(12) United States Patent
Oki et al.

(10) Patent No.: US 10,551,180 B2
(45) Date of Patent: Feb. 4, 2020

(54) WHEEL ALIGNMENT MEASUREMENT METHOD AND SYSTEM FOR VEHICLE WHEELS

(71) Applicant: Burke E. Porter Machinery Company, Grand Rapids, MI (US)

(72) Inventors: Folarin O. Oki, Kentwood, MI (US); Victor K. Graves, Lowell, MI (US); Paul Lee, Grand Rapids, MI (US)

(73) Assignee: Burke E. Porter Marchinery Company, Grand Rapids, MI (US)

( * ) Notice: Subject to any disclaimer, the term of this patent is extended or adjusted under 35 U.S.C. 154(b) by 204 days.

(21) Appl. No.: 15/719,953

(22) Filed: Sep. 29, 2017

(65) Prior Publication Data

US 2018/0094922 A1   Apr. 5, 2018

Related U.S. Application Data

(60) Provisional application No. 62/401,966, filed on Sep. 30, 2016.

(51) Int. Cl.
*G06K 9/00* (2006.01)
*G01B 11/275* (2006.01)
(Continued)

(52) U.S. Cl.
CPC ............. *G01B 11/275* (2013.01); *G06T 7/74* (2017.01); *H04N 5/247* (2013.01); *G06T 2207/30252* (2013.01)

(58) Field of Classification Search
CPC ....... G01B 11/275; G06T 7/74; G06T 7/0004; G06T 7/60; H04N 5/247
See application file for complete search history.

(56) References Cited

U.S. PATENT DOCUMENTS 3,630,623 A   12/1971   Schirmer
3,918,816 A   11/1975   Foster et al.
(Continued)

FOREIGN PATENT DOCUMENTS

DE         2948573 A1    6/1981
DE     102009015204 A1   10/2010
(Continued)

OTHER PUBLICATIONS

ISRA Vision Systems Press Release, No. 97, May 16, 2006 "Mounting Wheels Automatically on Moving Car Bodies."
(Continued)

*Primary Examiner* — Gregory M Desire
(74) *Attorney, Agent, or Firm* — Gardner, Linn, Burkhart & Ondersma LLP (57) ABSTRACT

A system and method of determining tire and wheel assembly alignment orientation for determining at least caster angle includes imaging a tire and wheel assembly mounted to a vehicle and suspension components of the vehicle associated with the tire and wheel assembly. Images are processed, including identifying a pivot feature for a steering component of the vehicle and identifying a circular feature of the tire and wheel assembly, with a rotational axis of the tire and wheel assembly being determined based on the identified circular feature, and a contrived line extending from the pivot feature and intersecting the rotational axis of the tire and wheel assembly is determined that represents the steering axis. Caster angle is then calculated from the angle the steering axis makes with the vertical direction when viewed from the side of the vehicle. An alignment sensor may be used to image the tire and wheel assembly and determine the rotational axis.

20 Claims, 11 Drawing Sheets

(51) Int. Cl.
*G06T 7/73* (2017.01)
*H04N 5/247* (2006.01)

(56) References Cited

U.S. PATENT DOCUMENTS

| | | | |
|---|---|---|---|
| 4,639,878 A | 1/1987 | Day et al. | |
| 4,647,208 A | 3/1987 | Bierman | |
| 4,690,557 A | 9/1987 | Wiklund | |
| 4,724,480 A | 2/1988 | Hecker et al. | |
| 4,863,266 A | 9/1989 | Masuko et al. | |
| RE33,144 E | 1/1990 | Hunter et al. | |
| 4,899,218 A | 2/1990 | Waldecker et al. | |
| 4,931,964 A | 6/1990 | Titsworth et al. | |
| 5,018,853 A | 5/1991 | Hechel et al. | |
| 5,044,746 A | 9/1991 | Henseli | |
| 5,048,954 A | 9/1991 | Madey et al. | |
| 5,054,918 A | 10/1991 | Downing et al. | |
| 5,177,558 A | 1/1993 | Hill | |
| 5,198,877 A | 3/1993 | Schulz | |
| 5,249,364 A | 10/1993 | Bishop | |
| 5,268,731 A | 12/1993 | Fuchiwaki et al. | |
| 5,274,433 A | 12/1993 | Madey et al. | |
| 5,291,264 A | 3/1994 | Longa et al. | |
| 5,291,660 A | 3/1994 | Koerner | |
| 5,519,489 A | 5/1996 | McClenahan et al. | |
| 5,532,816 A | 7/1996 | Spann et al. | |
| 5,583,797 A | 12/1996 | Fluegge et al. | |
| 5,600,435 A | 2/1997 | Bartko et al. | |
| 5,675,408 A | 10/1997 | Samuelsson et al. | |
| 5,703,796 A | 12/1997 | Moradi et al. | |
| 5,724,129 A | 3/1998 | Matteucci | |
| 5,724,743 A | 3/1998 | Jackson | |
| 5,731,870 A | 3/1998 | Bartko et al. | |
| 5,781,286 A | 7/1998 | Knestel | |
| 5,809,658 A * | 9/1998 | Jackson | G01B 11/2755 33/203.18 |
| 5,812,256 A | 9/1998 | Chapin et al. | |
| 5,815,257 A | 9/1998 | Haas | |
| 5,818,574 A | 10/1998 | Jones et al. | |
| 5,870,315 A | 2/1999 | January | |
| 5,930,881 A | 8/1999 | Naruse et al. | |
| 5,943,783 A * | 8/1999 | Jackson | G01B 11/2755 33/203.18 |
| 5,978,077 A | 11/1999 | Koerner et al. | |
| 6,070,332 A | 6/2000 | Kane | |
| 6,100,923 A | 8/2000 | Sass et al. | |
| 6,148,528 A | 11/2000 | Jackson | |
| 6,178,358 B1 * | 1/2001 | Colarelli | G01B 21/26 700/16 |
| 6,400,451 B1 | 6/2002 | Fukuda et al. | |
| 6,404,486 B1 | 6/2002 | Nobis et al. | |
| 6,412,183 B1 * | 7/2002 | Uno | G01B 11/2755 33/203.12 |
| 6,424,411 B1 | 7/2002 | Rapidel et al. | |
| 6,456,372 B1 | 9/2002 | Hudy | |
| 6,473,978 B1 | 11/2002 | Maas | |
| 6,532,673 B2 | 3/2003 | Jahn et al. | |
| 6,545,750 B2 | 4/2003 | Roth et al. | |
| 6,559,936 B1 | 5/2003 | Colombo et al. | |
| 6,580,971 B2 | 6/2003 | Bunn et al. | |
| 6,650,022 B1 | 11/2003 | Qi et al. | |
| 6,690,456 B2 | 2/2004 | Bux et al. | |
| 6,707,557 B2 | 3/2004 | Young, Jr. et al. | |
| 6,710,866 B1 | 3/2004 | Adolph | |
| 6,714,291 B2 | 3/2004 | Castagnoli et al. | |
| 6,731,382 B2 | 5/2004 | Jackson et al. | |
| 6,744,497 B2 | 6/2004 | Burns, Jr. | |
| 6,748,796 B1 | 6/2004 | Van Den Bossche | |
| 6,796,035 B2 | 9/2004 | Jahn et al. | |
| 6,802,130 B2 | 10/2004 | Podbielski et al. | |
| 6,836,970 B2 | 1/2005 | Hirano | |
| 6,879,403 B2 | 4/2005 | Freifeld | |
| 7,230,694 B2 | 6/2007 | Forster et al. | |
| 7,265,821 B1 | 9/2007 | Lawrence et al. | |
| 7,518,714 B2 * | 4/2009 | Voeller | G01B 11/2755 356/139.09 |
| 7,640,673 B2 * | 1/2010 | Jackson | G01B 11/2755 33/203.18 |
| 7,710,555 B2 | 5/2010 | Hoenke et al. | |
| 7,864,309 B2 | 1/2011 | De Sloovere et al. | |
| 8,107,062 B2 | 1/2012 | De Sloovere et al. | |
| 8,400,624 B2 | 3/2013 | De Sloovere et al. | |
| 2003/0012572 A1 | 1/2003 | Chapman | |
| 2005/0068522 A1 * | 3/2005 | Dorrance | G01B 11/2755 356/139.09 |
| 2008/0119978 A1 | 5/2008 | Stieff et al. | |
| 2009/0046279 A1 | 2/2009 | Tentrup et al. | |
| 2018/0094922 A1 * | 4/2018 | Oki | G06T 7/74 |

FOREIGN PATENT DOCUMENTS

| | | |
|---|---|---|
| EP | 0593066 A1 | 4/1994 |
| EP | 0593067 A1 | 4/1994 |
| EP | 0994329 A1 | 4/2000 |
| EP | 1221584 A1 | 7/2002 |
| EP | 1505363 A1 | 2/2005 |
| FR | 2808082 A1 | 10/2001 |
| WO | 2000071972 A1 | 11/2000 |
| WO | 0181860 A1 | 1/2001 |
| WO | 2008014783 A1 | 2/2008 |
| WO | 2010138543 A1 | 12/2010 |

OTHER PUBLICATIONS

Dürr Factory Assembly Systems (FAS) materials, Dr. Thomas Tentrup, believed to be dated Sep. 2006, with partial translation of pp. 12-14.

International Search Report and Written Opinion of the International Searching Authority from corresponding Patent Cooperation Treaty (PCT) Application No. PCT/IB2017/056035, indicated completed on Jan. 12, 2018.

* cited by examiner

WHEEL ALIGNMENT MEASUREMENT METHOD AND SYSTEM FOR VEHICLE WHEELS

CROSS REFERENCE TO RELATED APPLICATION

The present application claims priority of U.S. provisional application, Ser. No. 62/401,966 filed Sep. 30, 2016, which is hereby incorporated herein by reference in its entirety

BACKGROUND OF THE INVENTION

The present invention is directed to a wheel alignment measurement method and system for vehicle wheels, and in particular to a method and system utilizing imagers, such as cameras, for detecting features of a steerable wheel and determining alignment characteristics of the vehicle wheel.

Caster is a metric in suspension geometry that affects vehicle handling. Caster measures how far forward or rearward, on a flat and horizontal ground surface, the steering axis intersects with the ground relative to the center of the tire's contact patch when the assembly is viewed from the side. Caster is positive when the steering axis intersection with ground is in front of the contact patch center and negative when the intersection is behind the contact patch center. Caster is important in wheel alignment because positive caster imparts steering stability and causes steering return to center after turning. Excessively positive caster can require more power to steer the vehicle. On the other hand, negative caster decreases steering effort but also makes steering less stable, which is thus a tradeoff that is seldom made in modern vehicles due to the prevalence of power steering.

Caster angle is the angle the steering axis makes with vertical direction when viewed from the side of the vehicle. Caster angle is positive when top of the steering axis leans rearward relative to bottom and negative when it leans forward.

SUMMARY OF THE INVENTION

The present invention provides a method and system for determining the alignment of a wheel and tire assembly on a vehicle, and in particular for measuring caster angle.

According to an aspect of the present invention, a method of determining vehicle tire and wheel assembly alignment orientation includes imaging at least a portion of a tire and wheel assembly mounted to a vehicle and at least a portion of suspension components of the vehicle associated with the tire and wheel assembly with one or more imagers. The method further comprises processing one or more images of the tire and wheel assembly and suspension components with a control, with the processing including identifying a pivot feature for a steering component of the vehicle, identifying a circular feature of the tire and wheel assembly, determining a rotational axis of the tire and wheel assembly based on the identified circular feature, and determining a contrived line extending from the pivot feature and intersecting the rotational axis of the tire and wheel assembly, wherein the contrived line represents the steering axis of the tire and wheel assembly. Based on these determinations, the caster angle of the tire and wheel assembly can be determined.

In accordance with a particular aspect of the invention, a machine vision system is employed using imagers, such as cameras, to identify and measure the three dimensional position of vehicle features or components. The system processes one or more images to identify and measure the vehicle features or components, such as features or components that have a relationship to caster angle of the tire and wheel assembly to thereby measure or determine the caster angle. The imaged features or components include the tire and/or wheel rim, and may include machined surfaces, fasteners, such as nuts, bolts, and the like, a kingpin, or markings on the steering knuckle.

In particular embodiments the pivot feature comprises an axially extending feature, and the processing step of determining a contrived line extending from the pivot feature and intersecting the rotational axis of the tire and wheel assembly comprises determining a contrived line extending from the axially extending feature based on the three dimensional orientation of the axis of the axially extending feature. The axially extending feature may comprise a stud, such as a bolt extending from a lower ball joint.

In an alternative embodiment, the processing step of determining a contrived line extending from the pivot feature and intersecting the rotational axis of the tire and wheel assembly comprises determining a contrived line based on a provided steering angle inclination value for the vehicle, where the steering angle inclination value may be provided to the control, such as being stored in the control.

In a still further embodiment, a method of determining vehicle tire and wheel assembly alignment orientation includes determining a rotational axis of a tire and wheel assembly mounted to a vehicle via an alignment sensor disposed adjacent an outward facing side of the tire and wheel assembly, imaging at least a portion of suspension components of the vehicle associated with the tire and wheel assembly with an imager disposed inwardly of the tire and wheel assembly, and processing an image of the suspension components with a control, wherein the processing comprises identifying a pivot feature of the tire and wheel assembly. The method further includes determining a contrived line extending from the pivot feature and intersecting the rotational axis of the tire and wheel assembly, where the contrived line represents the steering axis of the tire and wheel assembly.

A system in accordance with an aspect of the present invention for performing the method comprises multiple of imagers, such as stereo cameras, for taking images of the interior side of a tire and wheel assembly and suspension components from beneath the vehicle. The system further includes a control, such as a computer, for processing the images, and may additionally include lights for illuminating the scene. In a particular embodiment a laser based three dimensional LIDAR scanner may be used to generate images.

The present method and system provides a way of measuring caster that is independent of operator performance and faster than conventional caster sweep methods, while requiring minimal mechanical moving parts. These and other objects, advantages, purposes and features of this invention will become apparent upon review of the following specification in conjunction with the drawings.

DESCRIPTION OF THE PREFERRED EMBODIMENTS

Figure 1:
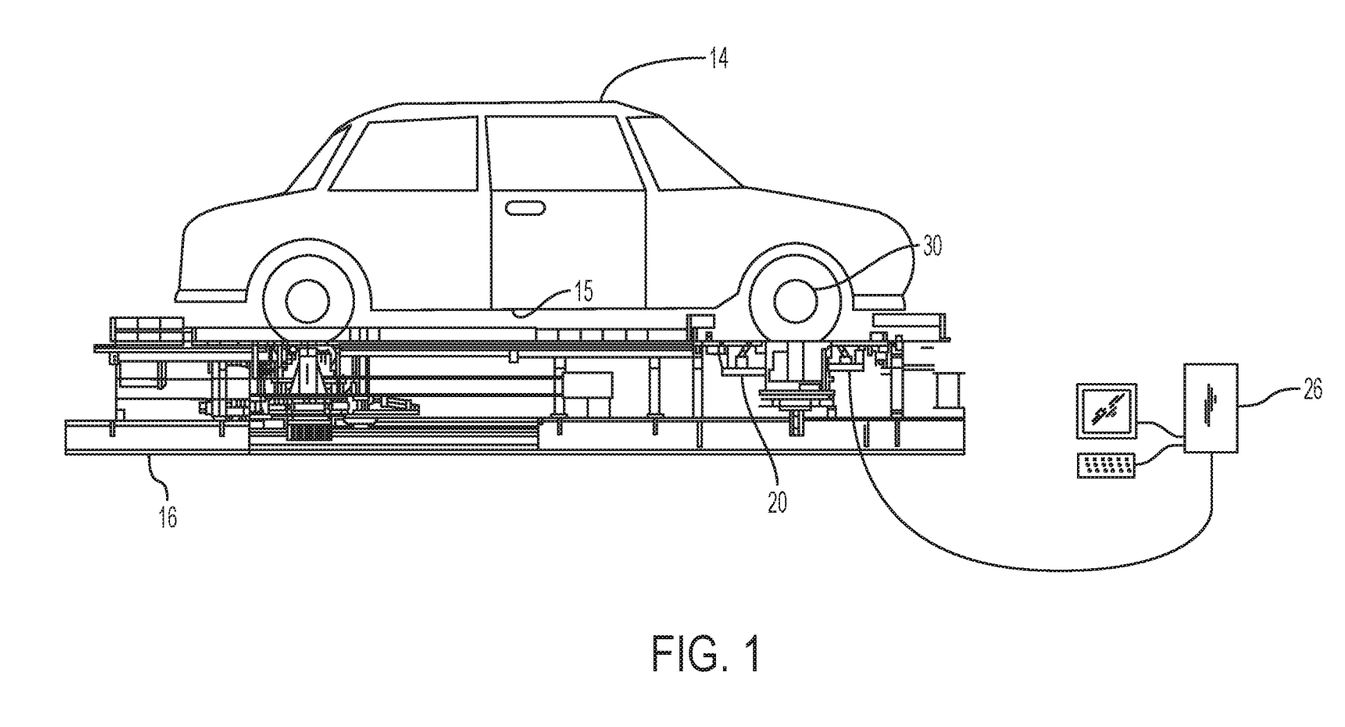
FIG. 1 is a side elevation view of a vehicle on a test stand employing a wheel alignment measurement system in accordance with an aspect of the present invention.
Figure 2:
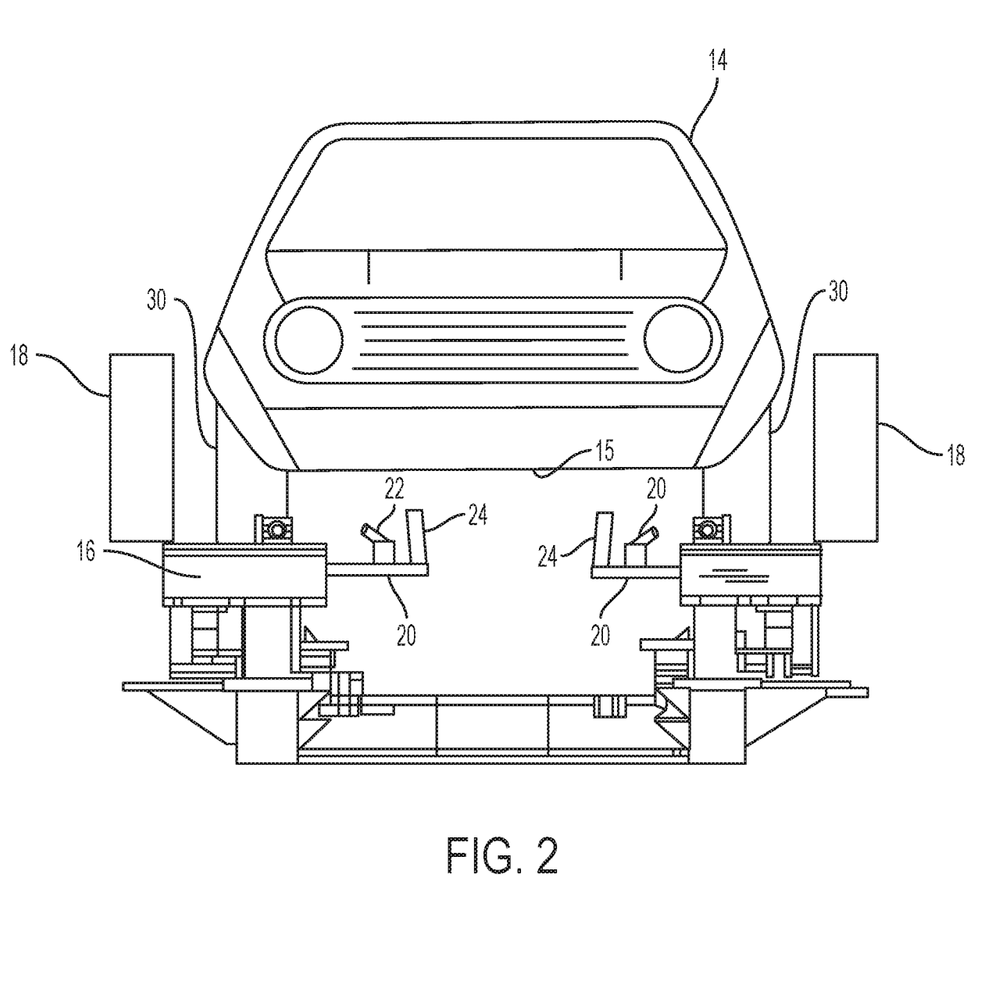
FIG. 2 is a front elevation view of the test stand of FIG. 1.

The present invention will now be described with reference to the accompanying figures, wherein the numbered elements in the following written description correspond to like-numbered elements in the figures. A vehicle 14 is shown in FIGS. 1 and 2 disposed on a vehicle test stand 16 that incorporates an embodiment of a vehicle tire and wheel assembly measurement system 20 in accordance with aspects of the present invention, with components of the system 20 shown separate from the test stand 16 in FIG. 3. As shown, system 20 includes a pair of imagers, which in the embodiment shown comprise cameras 22a, 22b, with the system additionally including associated lights 24a, 24b. System 20 further includes a control or controller, such as a microprocessor device or computer 26. In operation, cameras 22a, 22b image a tire and wheel assembly 30 mounted to vehicle 14 from the interior, underside of the vehicle 14, with the image taken including suspension components of the vehicle 14, such as the steering assembly. As discussed below, computer 26 is then operable to process the image to determine alignment characteristics of the tire and wheel assembly 30, including the caster angle 27 and caster 29, such as via machine vision processing techniques. In conjunction therewith, computer 26 may additionally store, and/or receive and rely on, information used in calculating tire and wheel assembly 30 orientation information, including information specific to particular vehicle makes and models undergoing measurement, such as design values for the steering axis inclination ("SAI"), CAD data related to vehicle geometry, and the like. System 20 may further incorporate or utilize additional sensors, such as non-contact wheel alignment sensors 18 (FIG. 2) disposed adjacent the exterior of tire and wheel assembly 30, that may be used to determine alignment characteristics and the orientation of the tire and wheel assembly 30, with that information being used in the determination of the caster angle 27 and caster 29 of the tire and wheel assembly 30.

Figure 5A:
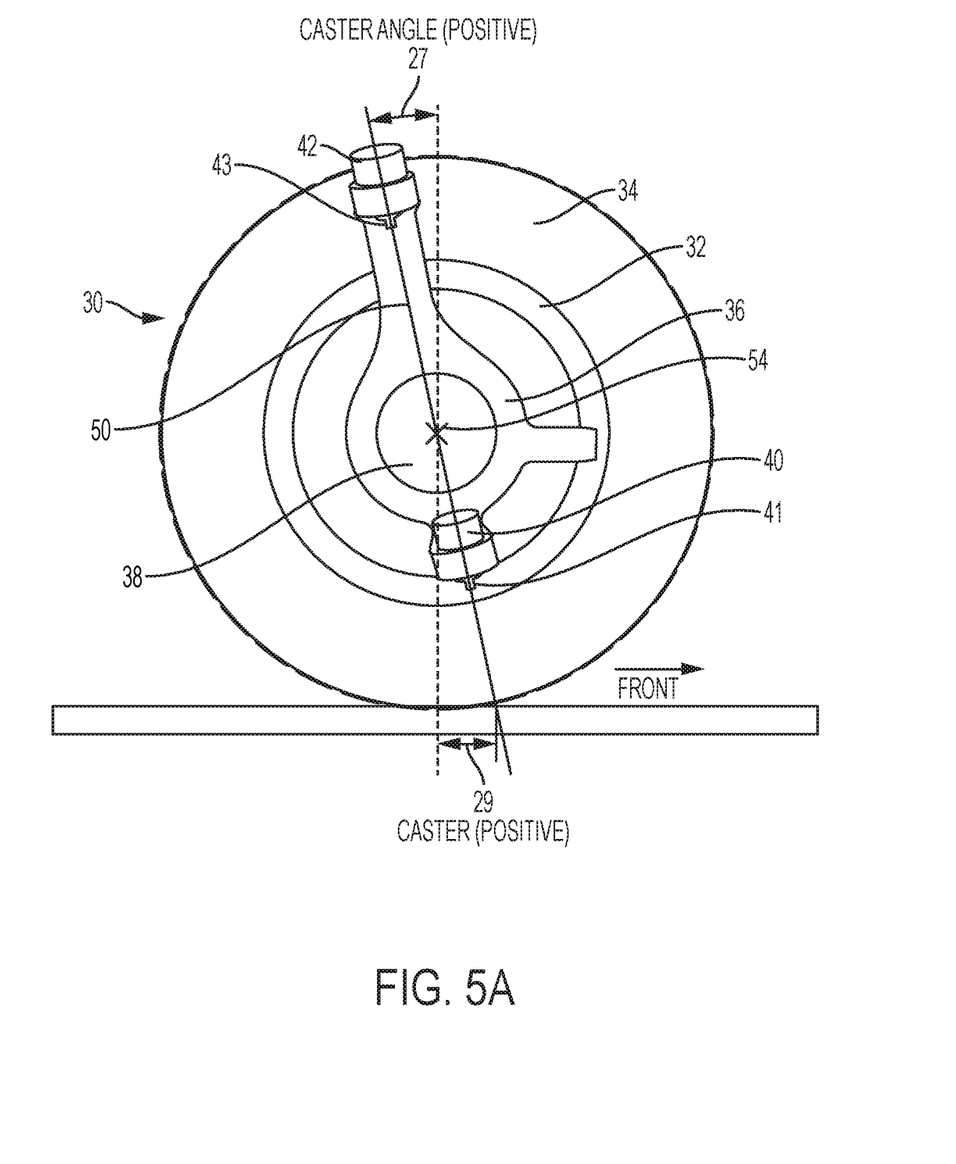
FIG. 5A is an interior side elevation view of the tire and wheel assembly of FIG. 4 shown removed from the vehicle and including suspension components.
Figure 5B:
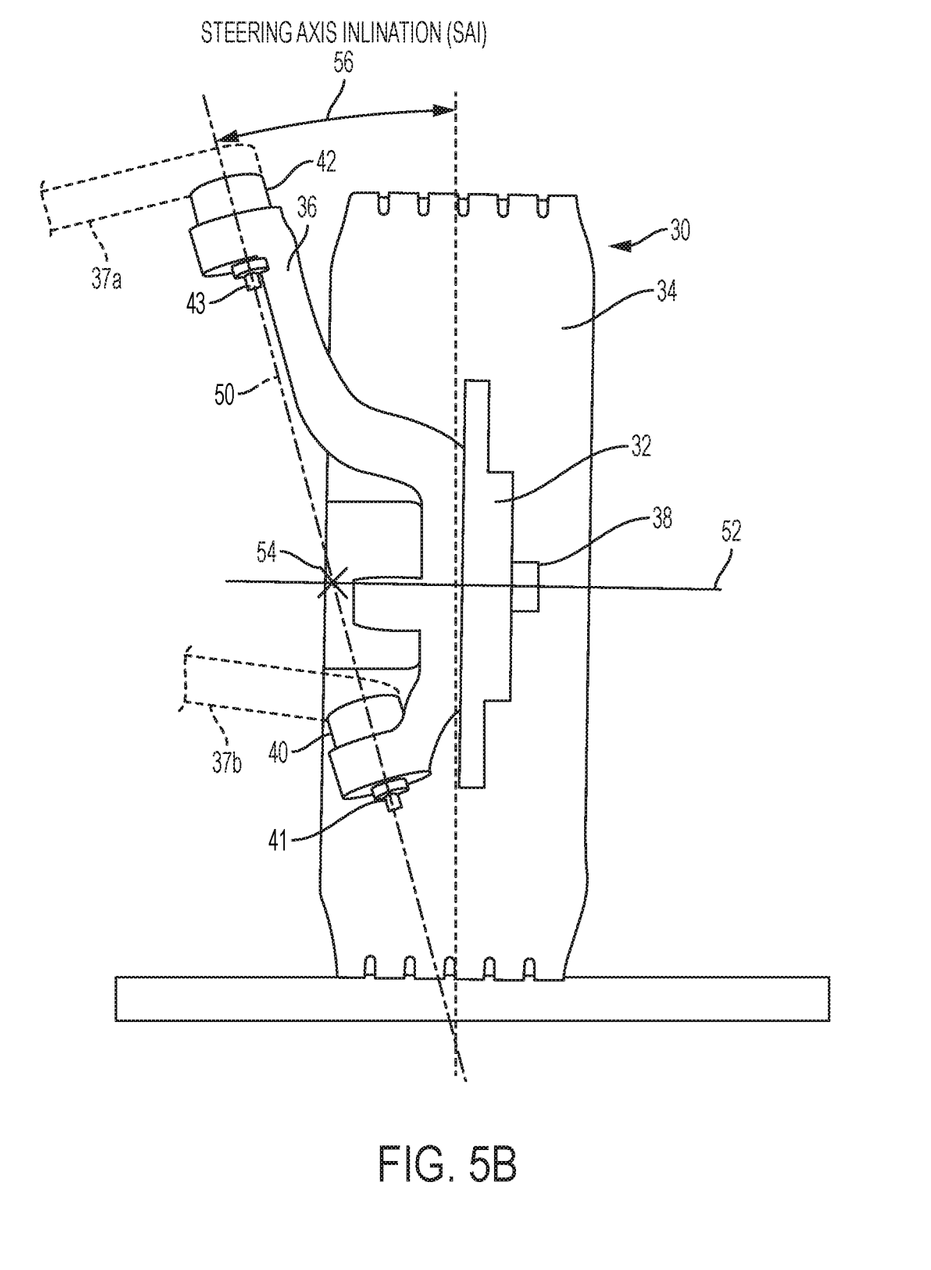
FIG. 5B is a front elevation view of the tire and wheel assembly of FIG. 5A.
Figure 6:
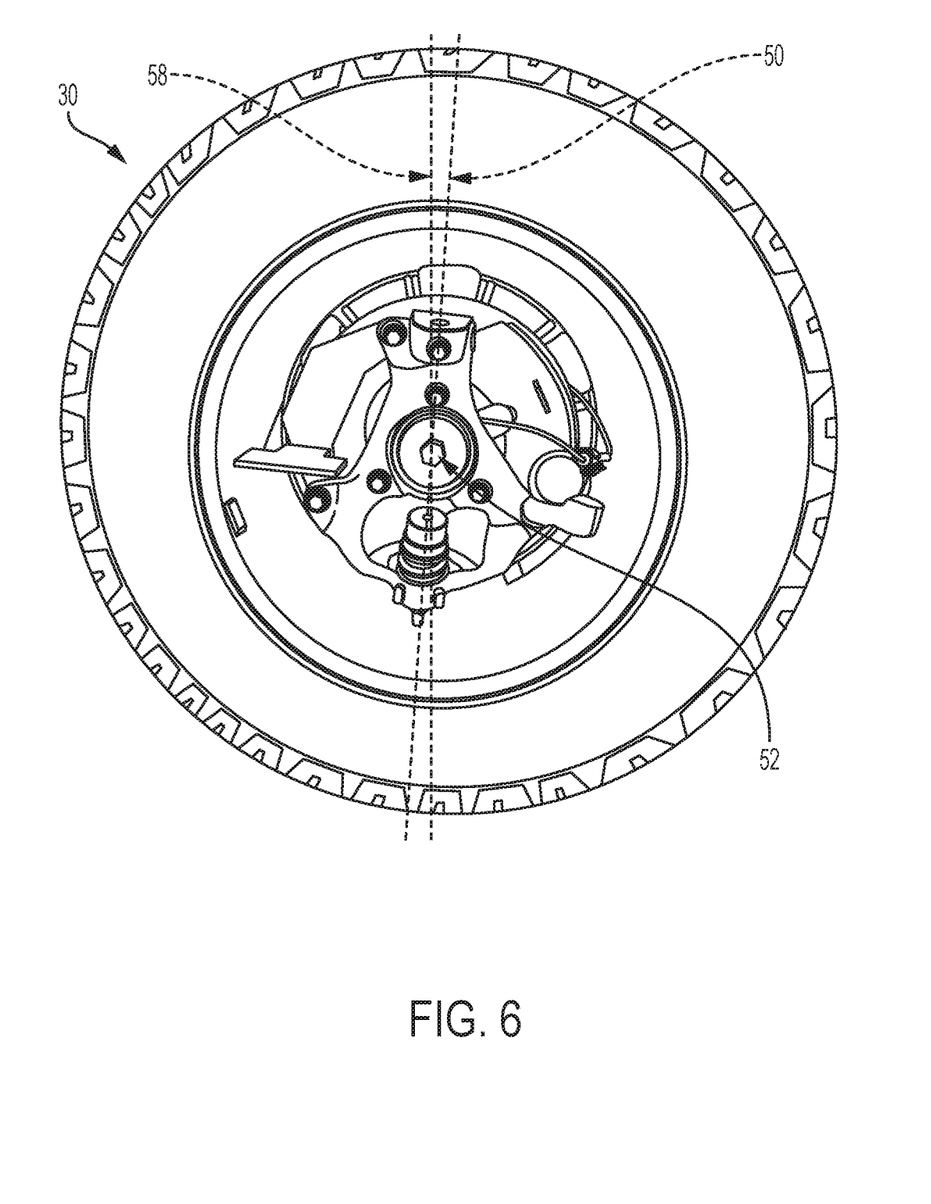
FIG. 6 is an interior perspective view of a tire and wheel assembly illustrating the caster angle.

As understood by way of reference to FIGS. 5A and 5B, tire and wheel assembly 30 is shown to include wheel 32, tire 34, a steering knuckle 36 interconnected to wheel 32 via a drive shaft 38. A lower ball joint 40 and an upper ball joint 42 are shown joined with steering knuckle 36, where ball joints 40, 42 are used in the connection of steering knuckle 36 with an upper control arm 37a and a lower control arm 37b (illustrated in FIG. 5B) of vehicle 14, where the control arms are in turn connected to the chassis and, along with the ball joints 40, 42, accommodate suspension movement as well as allow the tire and wheel assembly 30 to pivot around the ball joints 40, 42 for steering. The lower ball joint 40 includes an axial stud or fastener 41 extending there through for connection of the lower ball joint 40 with the steering knuckle 36 and/or the lower control arm. Similarly, upper ball joint 42 includes an axial stud or fastener 43 extending there through for connection of the upper ball joint 42 with the steering knuckle 36 and/or the upper control arm. The studs 41, 42 may comprise threaded bolts.

Figure 3:
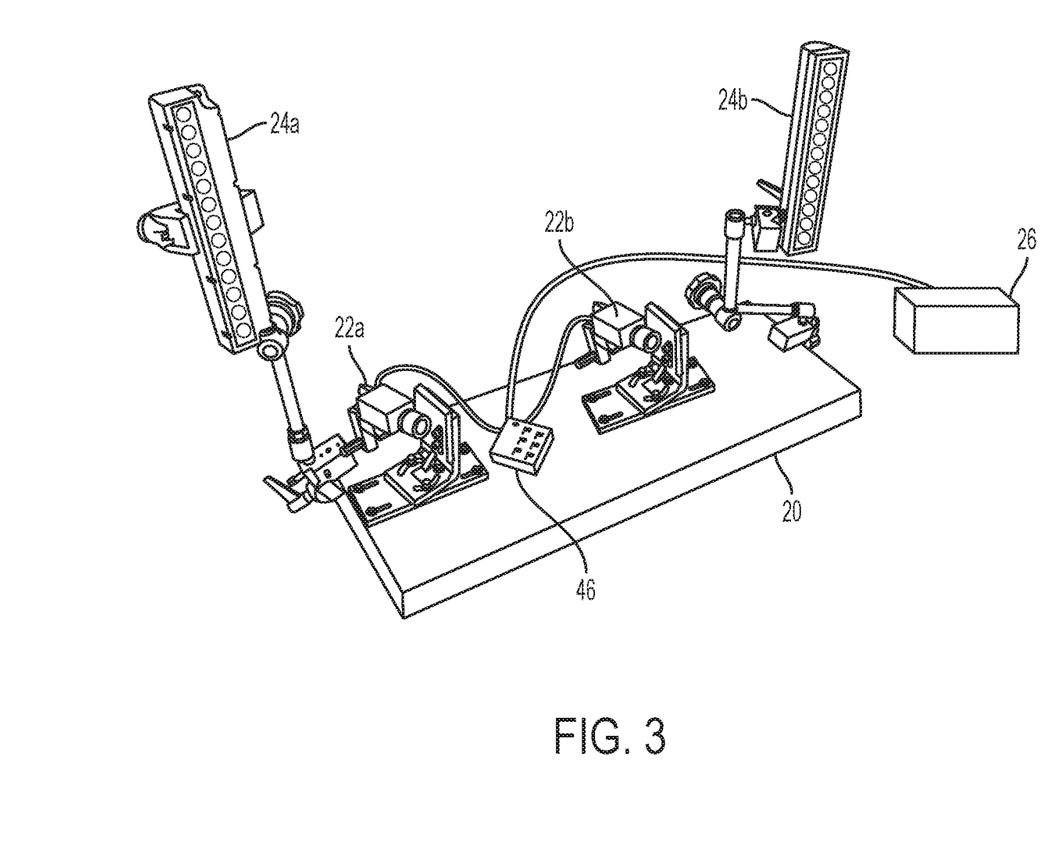
FIG. 3 is a perspective view of components of the wheel alignment measurement system in accordance with an aspect of the present invention shown removed from the test stand of FIG. 1.

Referring again to system 20 as shown in FIGS. 1-3, in the illustrated embodiment two calibrated cameras 22a, 22b are employed to provide a stereo photographic image. A switch 46, such as a gigabyte switch, may be provided to coordinate the images acquired by cameras 22a, 22b, with the images transmitted to computer 26. Lighting from lights 24a, 24b is employed to provide sufficient brightness to the scene from under the vehicle. In the illustrated embodiment lights 24a, 24b comprise LED lights. Alternatively, however, system 20 may employ incandescent, halogen or laser lights, or comprise a three dimensional scanner, such as a LIDAR system, for the acquisition of images. One or multiple images may be taken by cameras 22a, 22b for processing.

System 20 is shown in the illustrated embodiment as utilizing two cameras 22a, 22b, it should be appreciated, however, that a single imager or camera may be employed if it is able to sufficiently acquire the data necessary for processing to determine the alignment characteristics, as discussed below. As understood from FIG. 2, each tire and wheel assembly 30 for which alignment characteristics are to be determined may include the above noted components, such that in the illustrated embodiment two cameras 22a, 22b are used for each such tire and wheel assembly 30. It should be appreciated that having two or more cameras imaging each wheel allows computer stereo vision algorithms to extract the three dimensional position and orientation of the imaged features. For example, system 20 may comprise a machine vision system that acquires one or multiple images by way of one or more cameras to determine the three dimensional relative orientation or position of the tire and wheel assembly 30 and one or more components or features associated with the vehicle suspension, or have a relationship to caster angle of the tire and wheel assembly of the vehicle. Such features or components may include machined surfaces, fasteners, such as nuts, bolts, and the like, a kingpin, markings on the steering knuckle, or the like. Still further, it should be appreciated that reference to a wheel alignment measurement system as used herein may include one or more systems 20.

Figure 4:
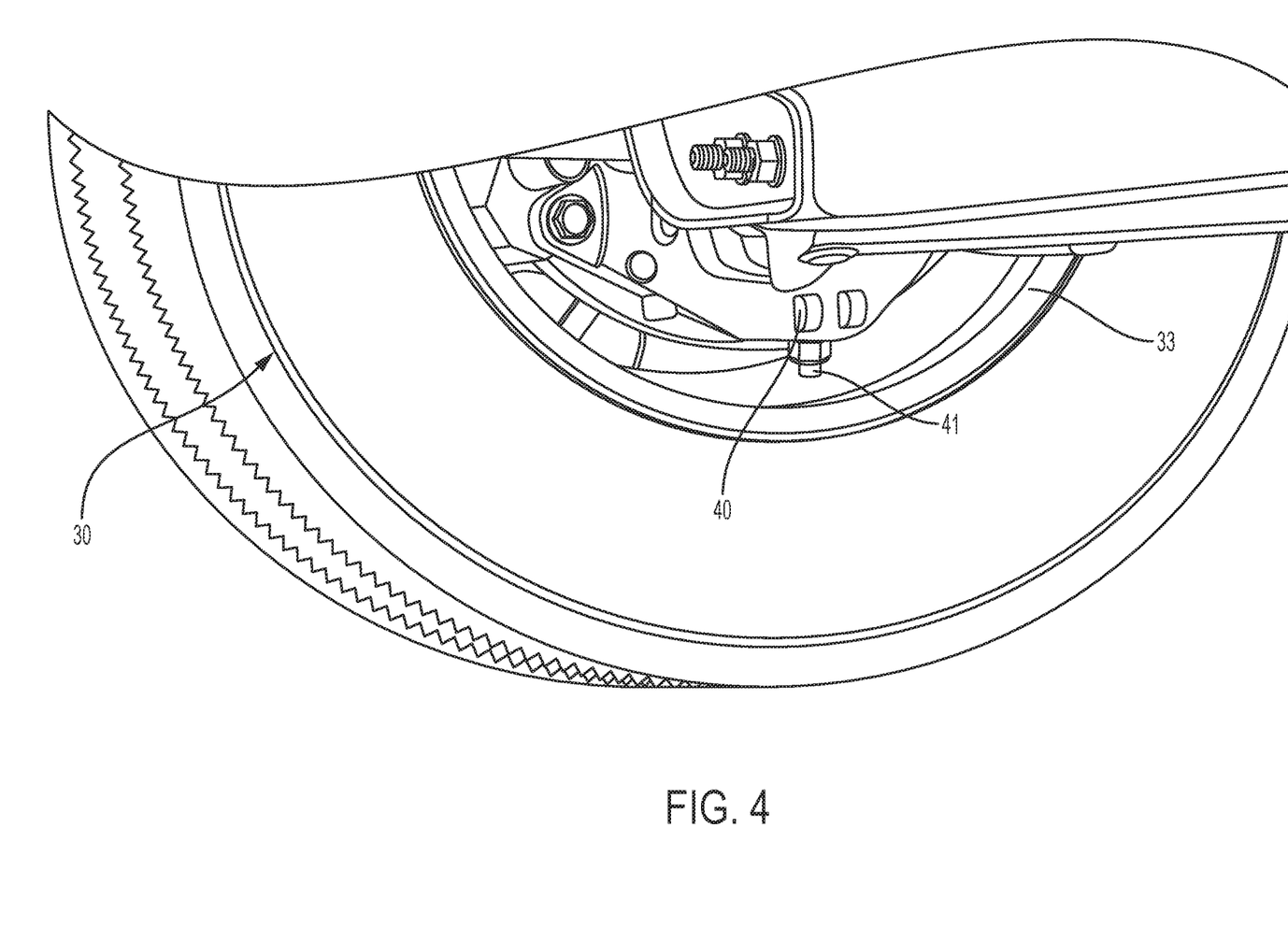
FIG. 4 is an interior partial perspective view of a tire and wheel assembly including suspension components as imaged by the wheel alignment measurement system.

The field of view ("FOV") of cameras 22a, 22b is configured such that cameras 22a, 22b image at least portions of the tire and wheel assembly 30, as well as at least portions of various suspension components, including the steering knuckle 36 and lower ball joint 40, from below the level of the underside 15 of vehicle 14. It should be appreciated that the entire steering knuckle 36 and/or the upper ball joint 42 will not always be visible for imaging due to obstruction from the rest of the suspension and steering assembly, such as understood from the interior image of tire and wheel assembly 30 of FIG. 4. Still further, some suspension designs do not have upper ball joints, such as suspensions employing a MacPherson strut in which the strut bearing between the strut and car body is used as the upper pivot point for steering. The lower ball joint is, however, typically visible from under the vehicle.

Among the features imaged by cameras 22a, 22b are components that have relationship to the steering axis or caster angle. As noted, images from cameras 22a, 22b are then processed via computer 26 to calculate caster angle 27 and caster 29. For example, features that have relationship to the steering axis or caster angle may be identified from vehicle CAD data, and then used to infer caster angle from images of those features. Features may include machined surfaces, fasteners (nuts, bolts, etc.), kingpin, tire, rim, steering knuckle, or markings on the steering knuckle. Markings could be pre-formed line or known shapes like a square or circle that are formed by machining, etching or scribing. For example, finding 3D pose of markings or machined surfaces on the steering knuckle could allow the system to derive pose of the steering knuckle. This would then allow the system to use the CAD data to find the steering axis and caster angle. Exemplary aspects of imaging such features and determining alignment characteristics are disclosed in U.S. Pat. No. 7,265,821, which is incorporated herein by reference.

Still further, and as discussed in more detail below, measurements from these proposed features can also be combined with information coming from an external alignment measurement system in order to calculate caster, such as the systems disclosed in U.S. Pat. Nos. 7,864,309; 8,107,062; and 8,400,624, which are incorporated herein by reference. Such information can include vehicle centerline, center of rotation of wheel, toe, and camber.

In a particular embodiment of the present invention the system 20 is configured to measure caster angle for vehicles in which the tire and wheel assembly 30 has a visible lower pivot point or pivot feature for steering, such as the lower ball joint 40 and/or stud 41 that is able to be imaged by cameras 22a, 22b, along with at least a portion of the wheel 32. In this case, the steering axis 50 can be derived as the line running through the centers of the upper ball joint 42 and lower ball joint 40. Once the steering axis 50 is known, caster angle 27 can be calculated as the angle of steering axis 50 relative to vertical in the vehicle's forward direction. Moreover, given images of the tire and wheel assembly 30 that include the stud 41 of the lower ball joint 40, the system 20 can infer the position of the steering axis 50 based on the axial orientation of the stud 41 and thus caster angle 27 without being able to image the upper ball joint 42.

Still further, the axis of rotation 52 of the wheel 32 will intersect the steering axis 50 in most vehicle makes and models. The stud 41 of the lower ball joint 40 and the stud 42 of the upper ball joint 43 are also typically oriented along the steering axis 50 in order to maximize the range of motion for the control arms. In addition, the steering axis inclination (SAI) 56 will be set by design or will be measurable to a certain degree from the orientation of the stud 41 of the lower ball joint 42. In view of these conditions that apply to many vehicle makes and models, the steering axis 50 can be found by identifying a contrived line segment associated with the steering axis 50 with one end on the lower ball joint 40, or on the stud 41 of the lower ball joint 40, and the other end of the contrived line segment on the axis of rotation 52 of the wheel 32.

The system accomplishes the identification of the contrived line segment of the steering axis 50 by calculating the three dimensional position of a circular feature on the wheel 32, such as associated with the rim or edge 33 of wheel 32, and determining the position of the stud 41 of the ball joint 40 from the images taken by cameras 22a, 22b. A point on the longitudinal axis of the stud 41 may be used to provide a first point for the contrived line for the steering axis 50. Likewise, the circular feature of the wheel 32, such as the rim 33, may be used to find the axis of rotation 52 of the wheel 32. That is, even though the entire wheel 32 is not imaged, as understood from FIG. 4, the imaging of an arc of the rim 33 enables the circular orientation of the wheel to be extrapolated. Then, based on the condition that the axis of rotation 52 of the wheel 32 intersects the steering axis 50, the system 20 can find a second point on the steering axis 50 by finding a point on the axis of rotation 52 of the wheel 32 that yields the desired SAI value when connected with the first point to form the steering axis 50. Accordingly, the two determined points can then be used to identify the steering axis 50 as the line running there through. The caster angle 27 is then calculated from the angle this contrived line of the steering axis 50 makes with the vertical direction 58 (FIG. 4) as viewed from the side of the vehicle.

In the illustrated embodiment of finding caster angle 27, the cameras 22a, 22b are preferably mounted below the vehicle and adjusted so that the lower ball joint and circular feature of wheel being used (e.g. tire rim) are in line of sight of both cameras 22a, 22b.

Figure 7:
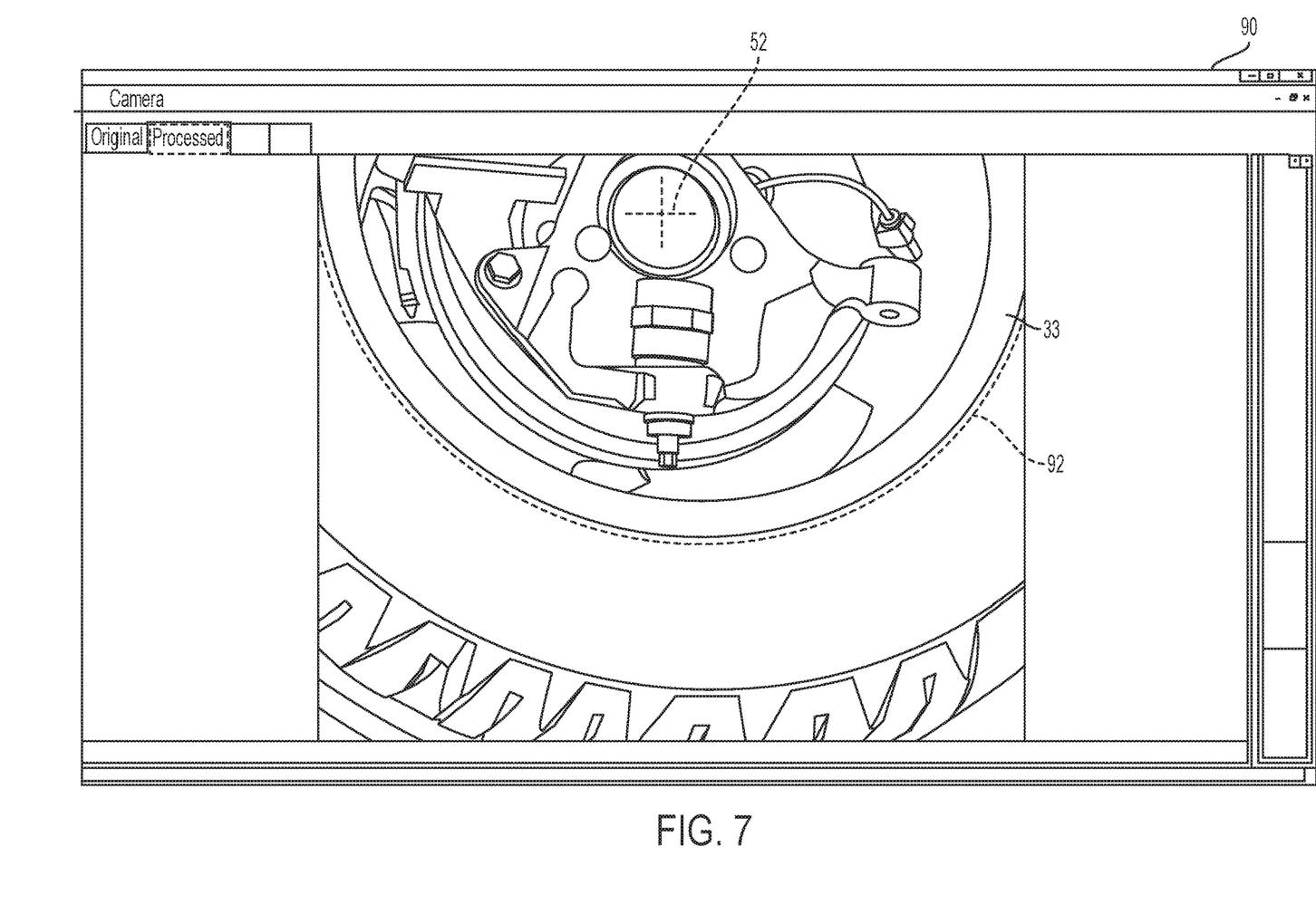
FIG. 7 is an exemplary image of a portion of an interior view of a tire and wheel assembly as imaged by the wheel alignment measurement system.
Figure 8:
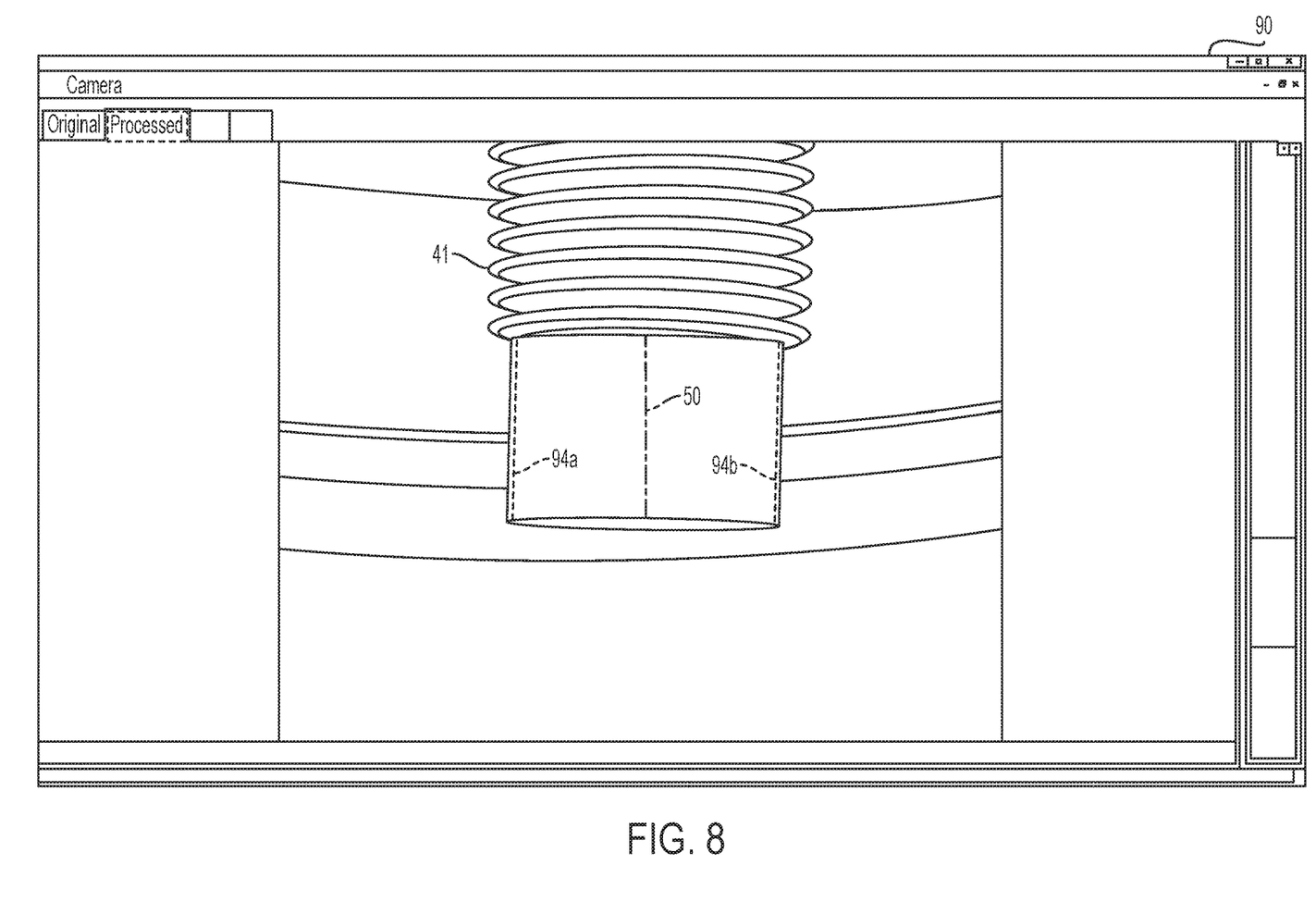
FIG. 8 is an exemplary close-up image of a portion of the tire and wheel assembly of FIG. 7.

Referring now to FIGS. 7 and 8, the determination by computer 26 of the axis of rotation 52 of the tire and wheel assembly 30 and the steering axis 50 is illustrated, where FIGS. 7 and 8 disclose exemplary images viewable on a display 90 associated with computer 26. As shown in FIG. 7, the machine vision system processing of computer 26 identifies a circle 92 concentric with and based on rim 33 of wheel 32, whereby axis of rotation 52 is representative of the normal vector thereto. Likewise, as shown in FIG. 8, the machine vision system processing of computer 26 identifies the outer edges or boundaries 94a, 94b of the stud 41, with the steering axis 50 being determined as disposed there between. It should be appreciated that the vision system processing for identification of components of vehicle 14 as used in the determination of caster may be done on other components and/or features other than rim 33 and the end of stud 41 as illustrated.

Figure 9:
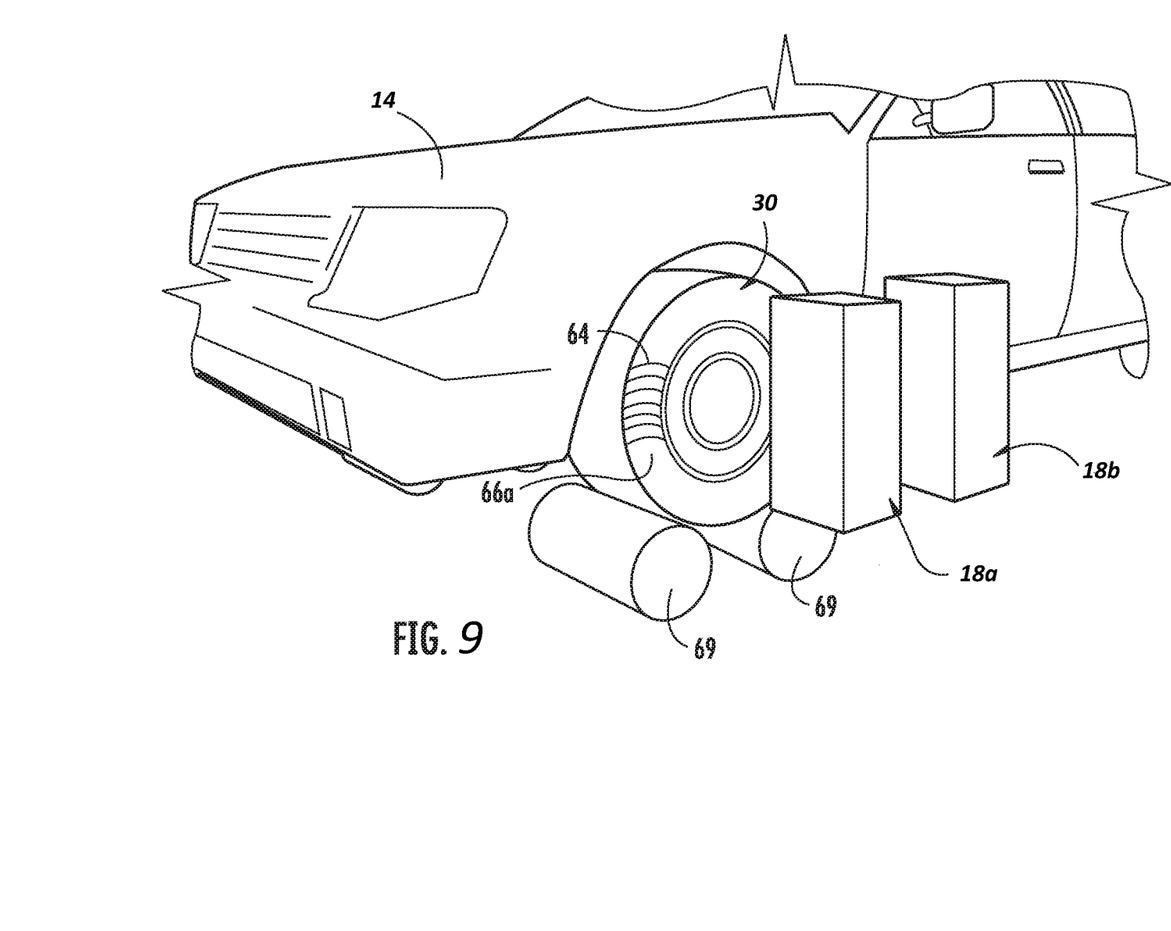
FIG. 9 is a perspective view of a pair of non-contact wheel alignment sensors positioned adjacent an exterior tire and wheel assembly of a vehicle.
Figure 10:
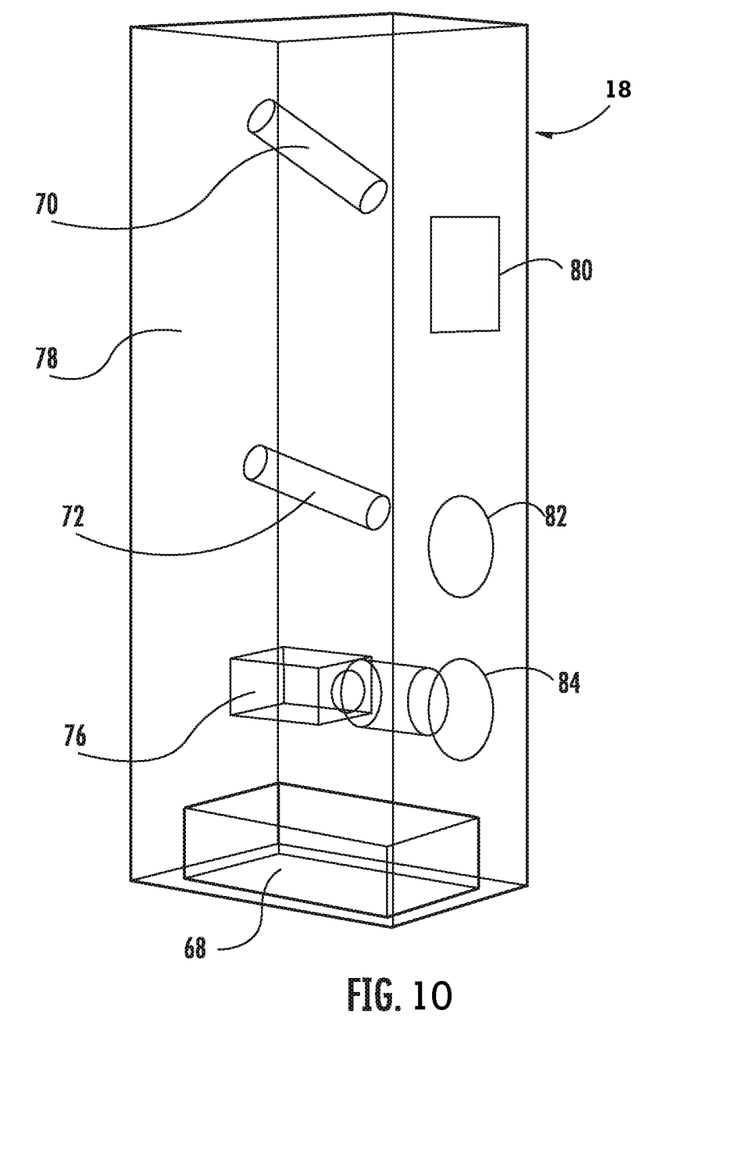
FIG. 10 is a schematic perspective illustration of a sensor of FIG. 9.

As previously noted, information from an additional alignment measurement apparatus may be incorporated with system 20 for determining caster. With reference to FIGS. 2, 9 and 10 of the illustrated embodiment, for example, an alignment sensor comprising a pair of non-contact wheel alignment sensors 18a, 18b are disposed adjacent the exterior orientation of each of the front two steering tire and wheel assemblies 30 of vehicle 14 when disposed on rollers 69 of test stand 16. Wheel alignment sensors 18a, 18b are configured in accordance with U.S. Pat. Nos. 7,864,309; 8,107,062; and 8,400,624 and, with reference to FIGS. 9 and 10, may include one or more light projectors 70, 72 and an imager 76 disposed within a housing 78 having windows 80, 82 and 84. Sensors 18 may include a processor 68, and/or may transmit data to computer 26 for processing. In the case in which sensors 18 include a processor 68, the processor 68 may cooperatively work with the computer 26 to jointly define a control.

In the illustrated embodiment, alignment sensors 18 operate to project a plurality of illumination lines 64 on the tire surface 66a of the tire and wheel assembly 30, with the light detectors 76 receiving reflected images of the illumination lines 64 whereby orientation features of the tire and wheel assemblies 30 may be determined. For example, alignment sensors 18a, 18b may be used to determine the rotational axis 52 of the wheel 32 by way of determining a three-dimensional circle of the tire 34 of the tire and wheel assembly 30. Still further, alignment sensors 18a, 18b may be used to derive a plane representing the orientation of the tire and wheel assembly 30, such as may be used for determining the toe and camber angles of the tire and wheel assembly 30, as well as the vehicle centerline.

Alignment sensors 18 may thus be used to determine the rotational axis 52 of the wheel 32, where this vector is determined as a normal vector to the determined plane of the wheel passing through the wheel's center of rotation based on the determined circle. Accordingly, the rotational axis 52 of the wheel 32 as determined by the alignment sensors 18 may be used in the caster determination, rather than using cameras 22a, 22b to determine the rotational axis 52 of the wheel 32 via the imaging of the rim 33 of wheel 32. This arrangement may provide improved accuracy in determining the rotational axis 52. It should be appreciated, however, that systems may be employed without alignment sensors 18 with the rotational axis 52 being determined via system 20 as previously discussed above, such as on stand-alone systems that do not include a wheel aligner sensor.

Although illustrated as including a pair of non-contact wheel alignment sensors 18a, 18b at each of the steering tire and wheel assemblies 30, it should also be appreciated that alternative sensors and/or arrangements may be employed. For example, a single alignment sensor 18 may be employed at each of the front tire and wheel assemblies 30. Alternatively operating sensors may also be utilized in place of alignment sensors 18a, 18b for determining the rotational axis 52 of the tire and wheel assembly. For example, alignment sensors may be configured to use machine vision processing techniques based on images, or stereo images, acquired of a tire and wheel assembly independent of the use of parallel projecting lines.

Prior to using system 20, such as to measure the caster angle, cameras 22a, 22b may be calibrated. In a first step, the intrinsic properties of the cameras 22a, 22b are established, such as field of view, skew, and optical center. In a second step, the extrinsic properties of the cameras 22a, 22b are established that will allow the cameras 22a, 22b to establish a relationship between the co-ordinate system of the cameras 22a, 22b and the real-world coordinate system. This step is necessary in order to calculate real world position and orientation of features being imaged relative to the position and orientation of the vehicle. Calibration can be accomplished, for example, with the use of a checkerboard patterned target or a calibration target whose exact three dimensional shape and dimensions are known.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of determining vehicle tire and wheel assembly alignment orientation, said method comprising:
    imaging at least a portion of a tire and wheel assembly mounted to a vehicle and at least a portion of suspension components of the vehicle associated with the tire and wheel assembly with at least one imager;
    processing an image of the tire and wheel assembly and suspension components with a control, wherein said processing comprises;
        identifying a pivot feature for a steering component of the vehicle;
        identifying a circular feature of the tire and wheel assembly;
        determining a rotational axis of the tire and wheel assembly based on the identified circular feature;
        determining a contrived line extending from the pivot feature and intersecting the rotational axis of the tire and wheel assembly, wherein the contrived line represents the steering axis of the tire and wheel assembly;
    wherein the pivot feature comprises an axially extending feature, and wherein said determining a contrived line extending from the pivot feature and intersecting the rotational axis of the tire and wheel assembly comprises determining a contrived line extending from the axis of the axially extending feature based on the three dimensional orientation of the axially extending feature.

2. The method of claim 1, wherein said determining a contrived line extending from the pivot feature and intersecting the rotational axis of the tire and wheel assembly comprises determining a contrived line based on a provided steering angle inclination value for the vehicle.

3. The method of claim 2, wherein the provided steering angle inclination value is provided to the controller.

4. The method of claim 1, wherein the axially extending feature comprises a stud.

5. The method of claim 4, wherein the stud is extending from a lower ball joint.

6. The method of claim 1, wherein said identifying a circular feature of the tire and wheel assembly comprises identifying a rim of the wheel of the tire and wheel assembly.

7. The method of claim 1, wherein said processing an image of the tire and wheel assembly and suspension components with a control further comprises determining a caster angle of the tire and wheel assembly based on the steering axis of the tire and wheel assembly.

8. The method of claim 1, wherein said imaging at least a portion of a tire and wheel assembly mounted to a vehicle and at least a portion of suspension components of the vehicle associated with the tire and wheel assembly with at least one imager comprises imaging with a plurality of imagers.

9. The method of claim 1, wherein said processing an image of the tire and wheel assembly and suspension components with a control further comprises determining a three dimensional position of the imaged tire and wheel assembly and suspension components.

10. The method of claim 1, wherein said imaging at least a portion of a tire and wheel assembly mounted to a vehicle and at least a portion of suspension components of the vehicle associated with the tire and wheel assembly with an imager comprises imaging an exterior facing portion of the tire and wheel assembly with an exteriorly disposed imager adjacent the tire and wheel assembly and imaging a portion of the suspension components with an interiorly disposed imager relative to the tire and wheel assembly.

11. The method of claim 10, wherein said exteriorly disposed imager comprises a non-contact wheel alignment sensor, and wherein said interiorly disposed imager comprises a three dimensional scanner.

12. A method of determining vehicle tire and wheel assembly alignment orientation, said method comprising:

determining a rotational axis of a tire and wheel assembly mounted to a vehicle via an alignment sensor disposed adjacent an outward facing side of the tire and wheel assembly;

imaging at least a portion of suspension components of the vehicle associated with the tire and wheel assembly with an imager disposed inwardly of the tire and wheel assembly;

processing an image of the suspension components with a control, wherein said processing comprises identifying a pivot feature of the tire and wheel assembly; and determining a contrived line extending from the pivot feature and intersecting the rotational axis of the tire and wheel assembly, wherein the contrived line represents the steering axis of the tire and wheel assembly;

wherein the pivot feature comprises an axially extending feature, and wherein said determining a contrived line extending from the pivot feature and intersecting the rotational axis of the tire and wheel assembly comprises determining a contrived line extending from the axis of the axially extending feature based on the three dimensional orientation of the axially extending feature.

13. The method of claim 12, wherein said imaging at least a portion of suspension components of the vehicle associated with the tire and wheel assembly with an imager comprises imaging at least a portion of the suspension components with a pair of imagers disposed inwardly of the tire and wheel assembly and below an underside level of vehicle.

14. The method of claim 12, wherein the alignment sensor comprises at least one non-contact wheel alignment sensor, and wherein said determining the rotational axis of the tire and wheel assembly comprises determining a circle defined by the tire and wheel assembly and determining a plane defined by the tire and wheel assembly, and wherein the rotational axis comprises a normal vector to the determined plane centered in the determined circle.

15. The method of claim 12, wherein the alignment sensor comprises at least one non-contact wheel alignment sensor, and wherein said imager disposed inwardly of the tire and wheel assembly comprises a three dimensional scanner.

16. A system for determining vehicle tire and wheel assembly alignment orientation on a vehicle, said system comprising:

an imager mounted to view at least a portion of suspension components associated with a tire and wheel assembly of a vehicle from below the level of an underside of the vehicle;

a device configured to image at least a portion of the tire and wheel assembly, wherein said device comprises said imager or an alignment sensor configured to be disposed adjacent an outward facing side of the tire and wheel assembly;

a control, wherein said control is operative to receive images from said imager and identify a pivot feature for a steering component of the vehicle associated with the tire and wheel assembly, wherein said control is operative to determine a rotational axis of the tire and wheel assembly, and wherein said control determines a contrived line extending from the pivot feature and intersecting the rotational axis of the tire and wheel assembly with the contrived line representing the steering axis of the tire and wheel assembly, and wherein the pivot feature comprises an axially extending feature, and wherein said determining a contrived line extending from the pivot feature and intersecting the rotational axis of the tire and wheel assembly comprises determining a contrived line extending from the axis of the axially extending feature based on the three dimensional orientation of the axially extending feature.

17. The system of claim 16, wherein said imager comprises a pair of cameras disposed below the level of the underside of the vehicle.

18. The system 16, wherein said control comprises machine vision processing of images received from said imager.

19. The system of claim 16, wherein said alignment sensor comprises a non-contact wheel alignment sensor, and wherein said control is configured to determine a circle defined by the tire and wheel assembly and a plane defined by the tire and wheel assembly.

20. The system of claim 16, comprising:

a second imager mounted to view at least a portion of suspension components associated with a second tire and wheel assembly of the vehicle from below the level of the underside of the vehicle; and a second device configured to image at least a portion of the second tire and wheel assembly, wherein said second device comprises said second imager or a second alignment sensor configured to be disposed adjacent an outward facing side of the tire and wheel assembly;

wherein said control is operative to receive images from said second imager and identify a pivot feature for a steering component of the vehicle associated with the second tire and wheel assembly, wherein said control is operative to determine a rotational axis of the second tire and wheel assembly, and wherein said control determines a contrived line extending from the pivot feature and intersecting the rotational axis of the second tire and wheel assembly with the contrived line representing the steering axis of the second tire and wheel assembly.

* * * * *